July 4, 1967

D. FIRTH 3,328,978

FLEXIBLE COUPLING

Filed Jan. 15, 1965

INVENTOR.
DAVID FIRTH
BY George S. Schwind
ATTORNEY

United States Patent Office 3,328,978
Patented July 4, 1967

3,328,978
FLEXIBLE COUPLING
David Firth, 1441 E. Jefferson Blvd.,
South Bend, Ind. 46617
Filed Jan. 15, 1965, Ser. No. 425,801
10 Claims. (Cl. 64—12)

This invention relates to couplings and in particular to flexible couplings for connecting two rotatable, axially positioned shafts.

Flexible couplings ordinarily are comprised of a pair of spaced facing members, one of which is mounted on each of two axially positioned shafts, the members being connected by some flexible means to form a driving connection whereby rotation of one shaft transmits rotation to the other shaft. Various types of flexible couplings have been previously utilized to connect axially positioned shafts, which are in substantial axial alignment with each other, and the prevalent types may be classified as torsionally rigid metallic couplings, such as gear couplings; and, torsionally resilient couplings which utilize a nonmetallic yielding element as the connecting means. The latter type of flexible coupling uses an elastic or resilient means to cushion the shock between the two coupling members and also serves to carry the load.

This invention relates to the latter type of flexible coupling in which the resilient or elastic means for connecting the coupling elements is in the form of a conventional V-belt. Although near perfect alignment of shafts connected by a flexible coupling is most desirable, it is almost impossible to retain alignment for long periods of time due to temperature changes, bearing wear, settling of foundations, deflection of supporting structures, vibration, high impact shock loads and other contributing related factors.

The flexible coupling which is the subject matter of my invention is capable of efficient operation under substantial angular or parallel misalignment of the coupling shafts, or with appreciable end float of one or both of its shafts, or combinations of either.

It is the primary object, therefore, of this invention to provide a relatively simple, compact, flexible coupling which is capable of carrying greater loads than couplings of comparable size heretofor used and at the same time accommodate all normal maladjustments such as angular misalignment, parallel misalignment and end float, which may occur between the driving and driven shafts of the said coupling.

A further object of the invention is to provide a flexible coupling which along with accommodating maladjustments between the driving and driven shafts, simultaneously cushions load shock and minimizes torsional vibrations and unbalance.

Another object is to devise a coupling having a smooth exterior surface and which is devoid of any pins or teeth for forming the driving connection between the coupling members.

Still another object of the invention is to provide a flexible coupling whose flexible connecting member can be replaced without disturbing the shaft fixtures or displacing the prime mover or driven machines associated with the coupling from their respective bases.

A further object is to provide a flexible coupling wherein the flexible member is readily available, such as a conventional V-belt having a continuous trapezoidal cross-section, or of the link type belt which is joined together to form a trapezoidal cross-section, or a round belt, any of which may be readily clamped into the grooves located in the coupling members to thereby provide the flexible connection between the driving and driven shafts.

Another object of the invention is to provide a flexible coupling having complementary offset sectors on the coupling members which are normally separated from each other but upon failure of the flexible member abut each other to form a positive drive means between the driving and driven shafts. Such provision enables utilization of the coupling on a temporary basis until repair of the flexible member can be accomplished, thus minimizing the shut down time of associated operating machinery.

Still a further object of the present invention is the use of identical, interchangeable, coupling members on both the driving and driven shafts.

Another object is to provide a coupling wherein the load carrying capacity of the coupling may be increased by any multiple without increasing the major diameter of the coupling or substantially increasing its length. This is accomplished by utilizing a plurality of flexible connecting means wherein the increase in the horsepower capacity of the coupling is directly proportional to the number of flexible elements used.

Another object of the invention is to provide a flexible coupling wherein the endless flexible connecting element is formed by either linking the ends of the element or clamping the ends in position.

And, another object of the present invention is to provide a flexible coupling which is constructed of a few relatively simple, easily fabricated parts which can be readily assembled and serviced without special tools or equipment.

These and other objects of the invention will become apparent from the following specification, which when taken in conjunction with the accompanying drawings, illustrates a preferred form of the invention.

Figures 3, 4, 5:
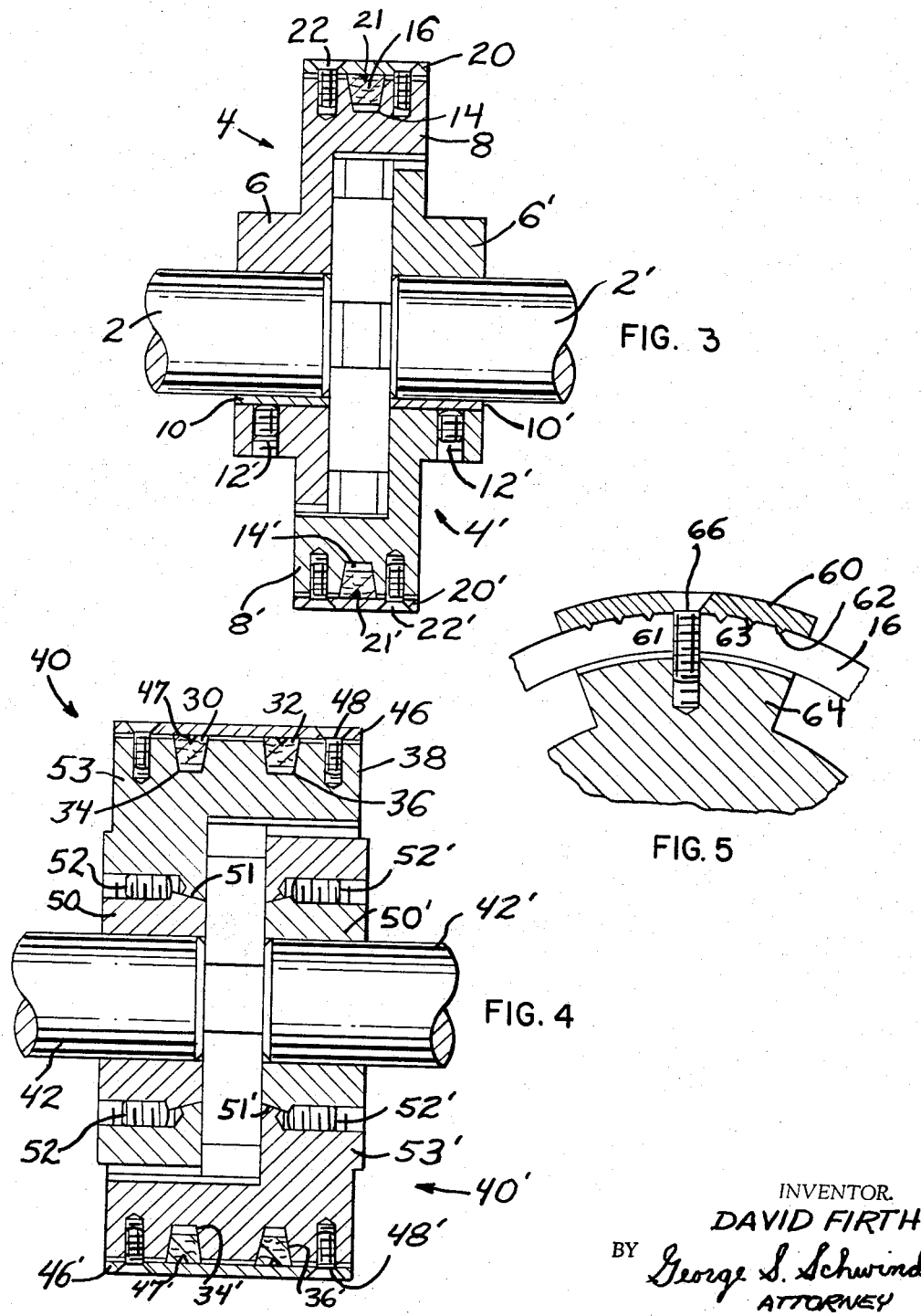
FIG. 3 is a cross-sectional view taken on line 3—3 of FIG. 1.

FIG. 4 is a cross-sectional view of a coupling using a plurality of flexible members and utilizing a split contractable bushing assembly for attaching the coupling elements to their respective shafts; and, FIG. 5 is a vertical cross-sectional view of a segment of a coupling taken along a plane parallel to the flexible element showing a modified clamping means for securing the element to the coupling.

Figure 1:
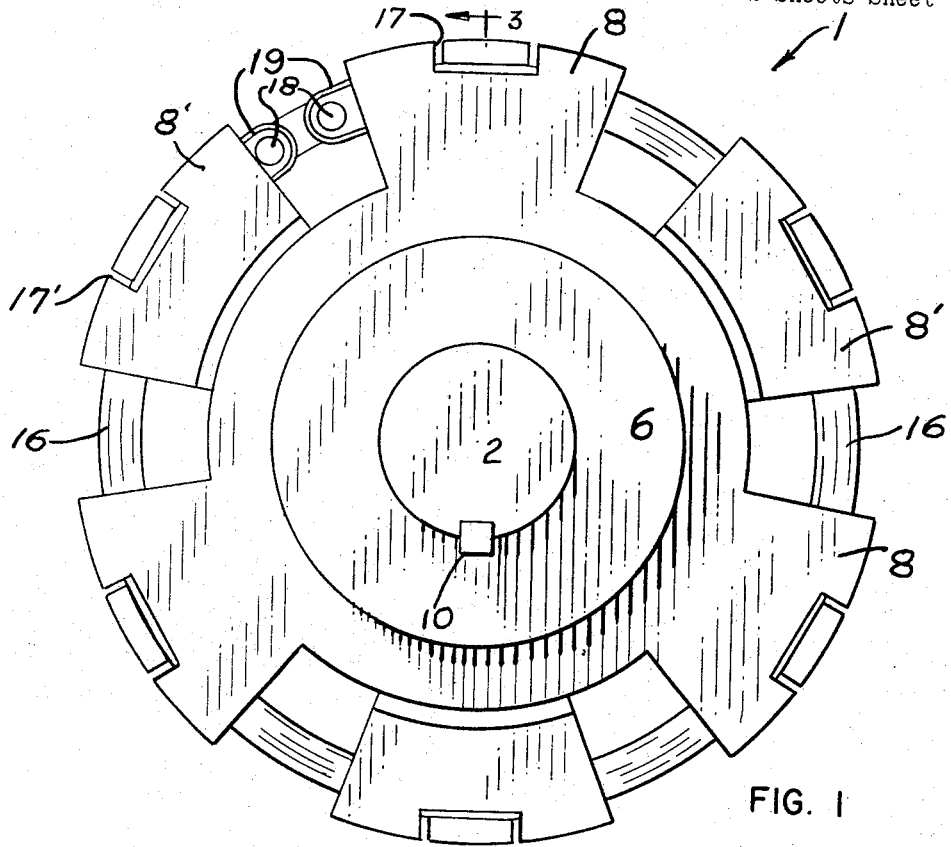
FIG. 1 is an elevational view of the flexible coupling.
Figure 2:
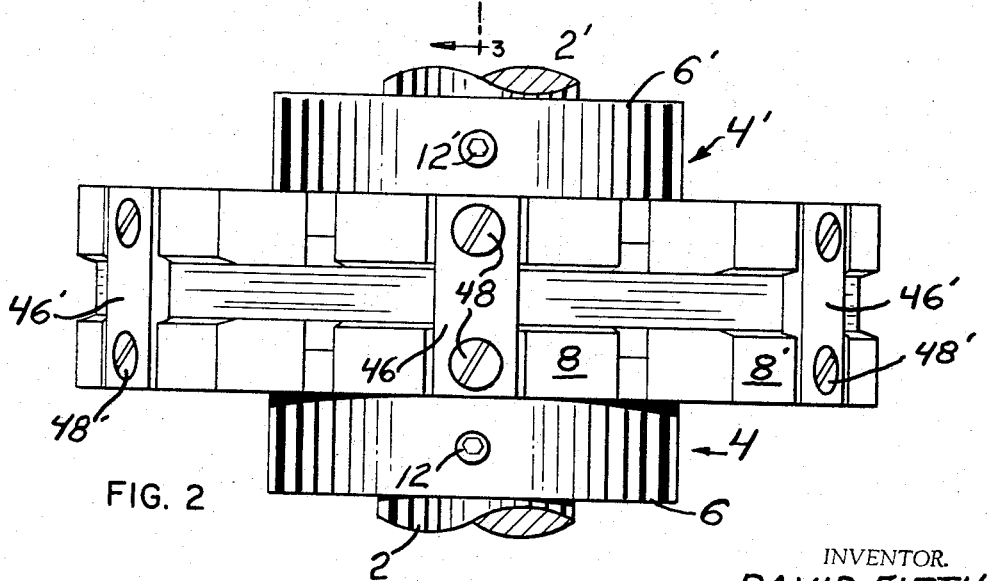
FIG. 2 is a plan view of the coupling shown in FIG. 1.

With reference to the drawing, and in particular to FIGS. 1-3, the flexible coupling generally designated as 1 consists of two separate coupling members or assemblies 4 and 4' which are mounted on driving and driven shafts 2 and 2', respectively, and are in substantial alignment with each other in spaced apart end relationship. In use, the driving shaft 2 is normally the shaft of a power source such as an electric motor, internal combustion engine or the like, and the driven shaft 2' is the power input shaft of any number of different machines. Although the shafts shown in the drawings are of the same size and have conventional key-ways, the coupling described herein may be adapted to driving and driven shafts of different diameters, straight or tapered, and with or without key-ways.

As the coupling members 4 and 4' are identical in structure and are therefore interchangeable and adapted to be used on either the driving or driven shafts, only one coupling element will be described in detail herein and like numerals will be used on like parts in the two coupling members, the distinction being only the use of primes to identify like parts on the other coupling member.

Each coupling member 4 includes a hub 6 having a plurality of equispaced offset sectors or lobes 8 positioned at the outer periphery of the hub. The sectors 8 are disposed parallel to and away from the hub 6 so that they extend toward the other member of the coupling. The hub 6 is secured to its respective shaft by conventional key 10 and set screw means 12 located in the hub, as clearly shown in FIG. 3. By way of illustration, each coupling member 4 has three such sectors 8. It is understood, however, that any plurality of sectors may be utilized provided that the spaces between the sectors be larger than the sectors themselves in order to permit a certain amount of movement between the coupling members 4 and 4' before the sectors of one member engage the sectors of the other member.

The arc-like periphery of each offset sector 8 includes a groove 14 extending along the entire periphery which is of constant trapezoidal cross-section and is located in a plane normal to the shaft on which the member 4 is mounted. The trapezoidal cross-section of the groove 14 is adapted to accept a connecting means or flexible element 16 such as a V-belt or rope having limited resilience lengthwise thereof as conventional. Upon proper positioning of the flexible element 16, to be hereinafter explained, the element is wedged into the groove 14, to thereby secure the element in place, by means of a clamp 20 which extends across each sector and is fastened to the sector by screws 22 adapted to be threadedly engaged into the sectors. Teeth-like projection means 21 formed on the bottom portion of the clamps 20 are positioned to engage the flexible element 16 upon tightening of the clamp by screws 22. The screws 22 are located on each side of the flexible element 16 and are countersunk into the clamp 20 to provide a smooth exterior surface on the outside periphery of the coupling, as shown in FIG. 2. With reference to FIGS. 1 and 2, recesses 17 on each sector 8 allow the clamp to be placed directly on the flexible element. The recesses 17 extend to a depth to allow exposure of the flexible element 16 to the clamp 20, as clearly shown in FIG. 1.

It is evident that the particular configuration of the groove 14 enables the flexible element 16 to be wedged into the groove to thereby prevent relative movement between the element and the members due to the frictional forces created upon tightening of the clamp 20 on the element 16 by screws 22. It is also noted that the particular configuration of the groove 14 permits the flexible element 16 to be wedged into the groove equally well whether the element be a V-belt or rope or variation thereof, due to the unique clamping structure explained supra.

With reference to FIG. 4, wherein primes are again used to identify like parts of the other coupling member, a flexible coupling utilizing the principle of the instant invention is shown wherein a plurality of flexible elements 30, 32 are laid in grooves 34, 36, respectively, in offset sectors 38. The grooves 34, 36 are of trapezoidal cross-section and are parallel to each other in planes normal to the shafts of the coupling. The trapezoidal cross-section of grooves 34, 36 is similar to groove 14 in FIG. 3, wherein the major base of the trapezoid lies on the outer periphery of sector 8 and the sides of the trapezoid form wedges toward the center of the member 4. The offset sectors 38 of coupling member 40 are extended horizontally toward each other to accommodate the plurality of flexible elements to thereby increase the load capacity of the coupling. It is noted that the feature of providing the additional flexible element doubles the load capacity of the coupling without increasing its outside diameter and without substantially increasing the overall length of the said coupling. Although a plurality of two flexible elements is illustrated to describe this most desirable feature of the coupling, it is understood that the plurality may be increased to three or additional elements with corresponding increases in the load carrying capacity of the coupling resulting. The fastening means for securing the flexible elements to the sectors 38 is similar to the means described in FIGS. 1-3, supra, wherein clamp 46 is in contact with the elements and wedges them into the grooves 34, 36 upon advancement of the screws 48 which are threadedly engageable into the sectors, as clearly shown in FIG. 4. Teeth-like projections 47 located on the bottom of the clamp 46 project into the flexible elements to thereby prevent slippage of the elements in their respective grooves.

With further reference to FIG. 4, the means for securing members such as 40 to their respective shafts 42 is disclosed in a patent to David Firth, No. 2,402,743 wherein a split contractible bushing 50 is inserted between shaft 42 and member 53, the latter having a tapered portion 51 on its inside bore. Upon advancement of the screw means 52, which are threadedly engageable into the member 53, the bushings which have unthreaded portions to accept the screw means 52, will be advanced with the screw means to simultaneously wedge the split bushing between the shaft 42 and member 53 to thereby secure the member and shaft in a manner as fully explained in the said patent.

In operation the coupling, when assembled in the manner shown in FIG. 1-3 of the drawing, provides a connection whereby rotation of the driving shaft 2 imparts rotation to the driven shaft 2' without direct contact between members 4 and 4'. The coupling members 4 and 4' are placed on their respective shafts 2 and 2', which are axially positioned in end to end relationship and in substantial axial alignment, so that the members may be prepositioned whereby the offset sectors 8, 8" are dovetailed or loosely interfitted in interdigital relation into each other at equidistant circumferentially spaced intervals until the grooves 14, 14" are circumferentially aligned. Upon alignment of the grooves 14, 14', which then lie in a plane normal to the shafts of the coupling, the members may be secured to the shaft by the set screw 12 and key means 10 which prevent relative rotation between the respective shaft and coupling member. The flexible element 16, which is in the form of a strip when being installed, is then placed in one of the grooves located in one of the sectors and clamped into place by the appropriate screw means of the sector. The element 16 is then encircled around the coupling and the ends of the flexible element are joined together by links 19 and pins 18 which comprise a means to form an endless belt, as shown in FIG. 1. The clamping of the flexible element is then completed by securing the clamps 20, 20' to their respective sectors 8, 8' to thereby wedge the element into the grooves 14, 14' to prevent slippage of the element on the members.

A modified means for securing the ends 61, 63 of the flexible element 16 together is shown in FIG. 5. A clamp 60 has projections 62 on its underside which are adapted to penetrate the element when pressure is applied to the clamp by screw means 66. The clamp 60 has an arc-like contour which complements the outer periphery of the sector 64. This feature allows a belt to be used without the need of any links or pins to form an endless belt as the two ends of the belt are merely butted together to form a circle and cut at the desired length and subsequently secured to the sector by clamp 60 to thereby form an endless belt or element. Screw means 66 enables the clamp 60 to be secured to the sector to thereby prevent pull-out or slippage of the belt.

Upon placement of the flexible element 16 in the grooves 14, 14' and securing the same, the coupling is ready for operation. Similarly, the method of replacing any flexible element, whether singly or a plurality, is the same as above described. It is noted that the breakage of any flexible element will not disturb the functioning of the coupling under normal circumstances as the sectors 8, 8' will abut one another in a driving relation until the flexible element may be replaced. The sectors 8, 8' perform similar to a jaw clutch during this time of operation without a flexible element.

Although the above is described with relation to the use of the coupling with a common V-belt, belts built up of leather or fabric, including synthetic, may also be used, as also could a round or rope type belt. The means for securing the flexible element 16 to the sectors 8, 8' to prevent slippage are assisted by the wedging of the belt or element into the trapezoidal grooves 14, 14' whereby frictional resistance of great magnitude may be exerted by the clamps 20, 20'.

It is evident from the foregoing description of this invention that a coupling made in accordance therewith allows considerable flexibility in operation and maintenance, and service may be performed without disturbance of the coupling proper, as contrasted with couplings heretofore in use. It is also evident that the simplicity and symmetry in the coupling members, and construction of the flexible connecting element make possible the operation of the coupling at high speeds with minimized centrifugal forces and vibrations thereby reducing undesired loading of shaft bearings.

Further, the construction of the coupling is of interrupted design and is adapted to fulfill all operating requirements associated with flexible couplings as to accommodating angular and parallel misalignment, end float, vibration and the cushioning of shock loads in an efficient manner.

From the above embodiment and modification herein described and illustrated, it will be evident to those skilled in the art that various modifications may be made in the construction without departing from he principles herein set forth.

I claim:
1. A flexible coupling comprising:
   (a) a plurality of coupling members adapted for mounting on the ends of axially aligned shafts;
   (b) a plurality of offset sectors on said members directed toward each other and positioned to loosely interfit said sectors into each other, each sector having a groove located on its outer periphery in circumferential alignment with the grooves of other sectors;
   (c) a flexible element having limited resilience lengthwise thereof positioned in each of the grooves to interconnect said coupling members; and
   (d) means to wedge said flexible element into each of said grooves to prevent relative movement between said element and said members, said means being anchored to the sectors spaced from said flexible element.

2. A flexible coupling comprising:
   (a) a plurality of complementary coupling members adapted for mounting on the ends of axially positioned shafts;
   (b) a plurality of offset lobes on said members directed toward each other and positioned to loosely interfit said lobes into each other, each lobe having a groove located on its outer periphery in circumferential alignment with the grooves of other lobes and a second groove intersecting said first groove;
   (c) a flexible element adapted to be positioned in each of the grooves and encircle said lobes to interconnect said members; and
   (d) means to wedge end anchor said flexible element into each of the grooves to prevent relative movement between the said element and said members and including a belt-engaging member secured to each lobe and received in said second groove.

3. A flexible coupling comprising:
   (a) a plurality of complementary coupling members adapted for mounting on the ends of axially aligned shafts;
   (b) a plurality of offset sectors on each of said members directed toward each other and positioned to loosely interfit said sectors into each other, each sector having a groove of trapezoidal cross-section located on its outer periphery and lying in a plane normal to the axially aligned shafts, in circumferential alignment with the grooves of other sectors;
   (c) a flexible element having limited resilience lengthwise thereof adapted to be positioned in each of the grooves to thereby encircle the members; and
   (d) means to wedge said flexible element into each of the grooves including a clamp adapted to engage said element, and, screw means associated with said clamp and positioned on each side of and spaced from said element on each of said sectors.

4. A flexible coupling comprising:
   (a) a plurality of complementary coupling members adapted for mounting on the ends of axially positioned shafts;
   (b) a plurality of offset lobes on said members directed toward each other and positioned to loosely interfit said lobes into each other at equidistant intervals, each lobe having a groove of trapezoidal cross-section located on its outer periphery and lying in a plane normal to the axially positioned shafts and in circumferential alignment with the grooves of other lobes, each lobe further having a recess intersecting each groove;
   (c) a flexible element having limited extensibility lengthwise thereof adapted to be positioned in each circumferentially aligned groove to thereby encircle said members;
   (d) a clamp positioned on each of said lobes in the recess, said clamp having a projection thereon adapted to penetrate said element; and
   (e) means to fasten said clamps to said lobes to thereby wedge said element into the groove of each lobe to prevent relative movement therebetween.

5. A flexible coupling comprising:
   (a) a plurality of complementary coupling members adapted for mounting on the ends of axially positioned shafts;
   (b) a plurality of offset sectors on said members directed toward each other and positioned to loosely interfit said sectors into each other at equidistant intervals, each sector having a groove of trapezoidal cross-section located on its outer periphery and lying in a plane normal to the axially positioned shafts and in circumferential alignment with the grooves of other sectors, each sector further having a recess on its outer periphery intersecting each groove;
   (c) a flexible element having limited resilience lengthwise thereof adapted to be positioned in each circumferentially aligned groove to thereby encircle said members;
   (d) a clamp positioned in the recess of each sector, said clamp having a projection thereon adapted to penetrate said element; and,
   (e) means to fasten said clamps to said sectors to thereby wedge said element into the groove of each sector to prevent relative movement therebetween; and
   (f) means for connecting the ends of said flexible element to form an endless flexible element.

6. A flexible coupling comprising:
   (a) a plurality of like coupling members adapted for mounting on the ends of axially positioned shafts;
   (b) a plurality of offset sectors on said members directed toward each other and positioned to loosely interfit said sectors into each other, each sector having a plurality of grooves of trapezoidal cross-section located on its outer periphery and lying in planes normal to the axially positioned shafts in circumferential alignment with the grooves of other sectors and a second groove intersecting said first named grooves;
   (c) a plurality of similar flexible elements having limited elasticity lengthwise thereof and each positioned in circumferentially aligned grooves to thereby encircle said members;
   (d) a clamp seated in the second groove of each of said sectors;
   (e) means to fasten said clamps to said sectors to thereby wedge each element into its receiving grooves to prevent relative movement therebetween and simultaneously form an endless flexible element.

7. A flexible coupling comprising:
(a) a plurality of like coupling members adapted for mounting on the ends of axially positioned shafts;
(b) a plurality of offset sectors on said members directed toward each other and positioned to loosely interfit said sectors into each other, each sector having a plurality of grooves of trapezoidal cross-section located on its outer periphery and lying in planes normal to the axially positioned shafts in circumferential alignment with the grooves of other sectors, each sector further having a recess intersecting each groove therein;
(c) a plurality of similar flexible elements each positioned in circumferentially aligned grooves to thereby encircle said members;
(d) a clamp positioned in each recess of said sectors;
(e) projection means on each of said clamps adapted to penetrate said elements; and,
(f) means to fasten said clamps to said sectors to thereby wedge each element into its receiving grooves to prevent relative movement therebetween.

8. A flexible coupling for connecting two axially positioned shafts in end to end relation comprising:
(a) a first member adapted to be secured to a shaft;
(b) a second member similar to said first member and adapted to be secured to a second shaft;
(c) means to secure said first and second members to their respective shafts;
(d) a plurality of offset sectors located on the outer radii of said first and second members, said sectors projecting in an axial direction toward each other and adapted to fit loosely into each other at equidistant intervals, each sector having a plurality of grooves located on its outer periphery, the grooves being of trapezoidal cross-section and in circumferential alignment with the grooves of other sectors;
(e) a plurality of flexible elements each positioned in circumferentially aligned grooves to thereby encircle each member;
(f) a clamp peripherally positioned on each of said sectors adapted to wedge each element into its respective groove;
(g) screw means for securing each clamp to each sector, spaced from said elements to engage and thereby wedge said elements into their respectively aligned grooves.

9. A flexible coupling for connecting two axially positioned shafts in end to end relation comprising:
(a) a first member adapted to be secured to a shaft;
(b) a second member similar to said first member and adapted to be secured to a second shaft;
(c) means to secure said members to their respective shafts;
(d) a plurality of offset lobes located on said first and second members, said lobes projecting in an axial direction toward each other and adapted to loosely interfit with each other at equidistant intervals, each lobe having a plurality of grooves located on its outer periphery, the groove being of trapezoidal cross-section and in circumferential alignment with the grooves of other lobes, each lobe further having a recess on its outer periphery intersecting each groove;
(e) a plurality of similar flexible elements each positioned in circumferentially aligned grooves to thereby encircle the said members;
(f) a clamp positioned in each recess of each said lobes;
(g) projection means on said clamp adapted to penetrate said flexible element; and,
(h) screw means for fastening each clamp to a lobe to thereby wedge said elements into their respective aligned grooves and simultaneously form endless flexible elements.

10. A flexible coupling for connecting two axially positioned shafts in end to end relation comprising:
(a) a first member adapted to be secured to a shaft;
(b) a second member adapted to be secured to a second shaft, said second member similar to said first member;
(c) means to secure said members to their respective shafts;
(d) a plurality of offset sectors located on said first and second members, said sectors projecting in an axial direction toward each other and adapted to interfit loosely with each other at equidistant intervals, each sector having a plurality of grooves located on its outer periphery, the grooves being of trapezoidal cross-section and in circumferential alignment with the grooves of other sectors, each sector further having a recess in its outer periphery intersecting each groove;
(e) a plurality of flexible elements having limited elasticity lengthwise thereof each positioned in circumferentially aligned grooves to thereby encircle the said members;
(f) a clamp positioned in each recess of each said sectors;
(g) projection means on said clamp adapted to penetrate said flexible elements; and,
(h) screw means on said clamps for fastening said clamps to each of said sectors to thereby wedge said elements into their circumferentially aligned grooves; and,
(i) means to connect the ends of each flexible element to form endless flexible elements.

References Cited

UNITED STATES PATENTS

| | | | |
|---|---|---|---|
| 322,866 | 7/1885 | Tabor | 64—12 |
| 1,302,248 | 4/1919 | Ungar | 64—13 |
| 1,659,353 | 2/1928 | Dwyer | 64—12 |
| 1,734,988 | 11/1929 | Wilson | 64—12 |
| 2,164,842 | 7/1939 | Smith | 64—11 |
| 2,740,271 | 4/1956 | Beler | 64—11 |
| 2,867,102 | 1/1959 | Williams | 64—11 |

FOREIGN PATENTS

| | | |
|---|---|---|
| 636,128 | 1/1928 | France. |
| 1,180,254 | 12/1958 | France. |
| 1,211,675 | 10/1959 | France. |
| 23,187 | of 1905 | Great Britain. |

FRED C. MATTERN, Jr., *Primary Examiner.*

HALL C. COE, *Examiner.*